United States Patent [19]

Vahrenkamp

[11] 4,315,153

[45] Feb. 9, 1982

[54] FOCUSING EXB MASS SEPARATOR FOR SPACE-CHARGE DOMINATED ION BEAMS

[75] Inventor: Richard P. Vahrenkamp, Newbury Park, Calif.

[73] Assignee: Hughes Aircraft Company, Culver City, Calif.

[21] Appl. No.: 151,009

[22] Filed: May 19, 1980

[51] Int. Cl.[3] .......... G21K 1/08; B01D 59/44

[52] U.S. Cl. .......... 250/396 R; 250/281; 250/294; 250/398

[58] Field of Search .......... 250/309, 281, 396, 294

[56] References Cited

U.S. PATENT DOCUMENTS

| | | | |
|---|---|---|---|
| 2,219,405 | 10/1940 | Sukumlyn | 250/396 ML |
| 2,947,868 | 8/1960 | Herzog | 250/309 |
| 3,671,895 | 6/1972 | Aucouturier | 250/396 ML |
| 4,019,989 | 4/1977 | Hazewindus | 250/396 R |
| 4,132,892 | 1/1979 | Wittmaack | 250/309 |

*Primary Examiner*—Harold A. Dixon
*Attorney, Agent, or Firm*—Allen A. Dicke, Jr.; W. H. MacAllister

[57] ABSTRACT

The ExB mass separator provides a magnetic field B normal to the beam path and potential plate for applying an electric field normal to the magnetic field for maintaining the selected ions in beam 32 along a defined path. Along the path, after the major portion of the unwanted species are deflected from the beam, focus plates 34 and 36 focus the selected species toward the separator opening 38. Downstream potential plates 28 and 30 maintain the defined path for the selected species.

10 Claims, 5 Drawing Figures

FOCUSING EXB MASS SEPARATOR FOR SPACE-CHARGE DOMINATED ION BEAMS

TECHNICAL FIELD

This invention is directed to an ExB mass separator for separating and focusing ion beams. The mass separator utilizes a permanent magnet and segmented electric field plates. Focus elements are provided to allow collimation of the desired ion species after separation has taken place. The separator is useful for focusing and separating ion beams which are space-charge dominated.

In the past, ion beam equipment which produced separated ion beams was comprised of separate functional components which were connected together to form the ion beam line. An ion source was used and had its own magnetic structure if such was required for the production of the ion beam. Ion separation downstream from the ion source required additional separation components. Due to the separate element approach, such a structure is unnecessarily long and complex. In the case of high current, low energy beams, these disadvantages were particularly troublesome because severe space-charge expansion occurs in the region between the ion source and the ion separator.

The ion beam produced by an ion source is not pure. In addition to the desired ion species, other ions are present due to contamination of the fuel, contributions of material by other parts in the source and fuel components. Since the ions are moving in a stream, they are subject to deflection by a magnetic field or an electric field. For any particular magnetic or electric field, different ion species are directed along known but different paths. Furthermore, when the correct orientation and field strength of both the electric and magnetic fields is employed, then the selected ion species can be directed along a preselected path, even a straight line. In such an ion analyzer, the electric and magnetic fields are at an angle to each other, usually at right angles to the ion path. Due to this orientation, they are commonly called E cross B filters. In the jargon this is written as ExB.

Attempts to locate the separator just downstream of the ion source were unsuccessful because the magnetic fields interfered. The axial magnetic field in the ion source was disturbed by the transverse magnetic field in the ExB separator. These problems were overcome by the structure taught by John R. Bayless, Robert L. Seliger, James W. Ward and James E. Wood in their U.S. Pat. No. 4,163,151 directed to an ion source with separation components directly coordinated therewith.

High current ion beams increase the speed of implantation, when the structure is used as an implantation source, and thus higher currents are desirable. However, higher current increases the spaced-charge effects in the beam, which cause beam separation as it leaves the source. Most of the prior ExB ion beam analyzers were used in high voltage, low current applications where space-charge effects are negligible and thus new problems arise in attempting to separate and control a beam operating at high current and low voltage.

SUMMARY OF THE INVENTION

In order to aid in the understanding of this invention it can be stated in essentially summary form that it is directed to a focusing ExB separator for analyzing ion beams which are space-charge dominated. This is accomplished by providing electric field plates in the ExB separating section which provide for focusing of the desired ion species during separation.

It is thus an object of this invention to provide a mass separator which has a focusing section built therein so that the desired ion species in the beam entering the separator can be focused during its passage therethrough to minimize the effect of space-charge effects in high current, low voltage ion beams. It is a further object to provide a focusing ExB mass separator which is particularly suitable for integrated ion beam production systems for operation at high current and low voltage which are compact and structurally convenient.

Other objects and advantages of this invention will become apparent from a study of the following portion of this specification, the claims and the attached drawings.

DESCRIPTION OF THE PREFERRED EMBODIMENTS

Figure 1:
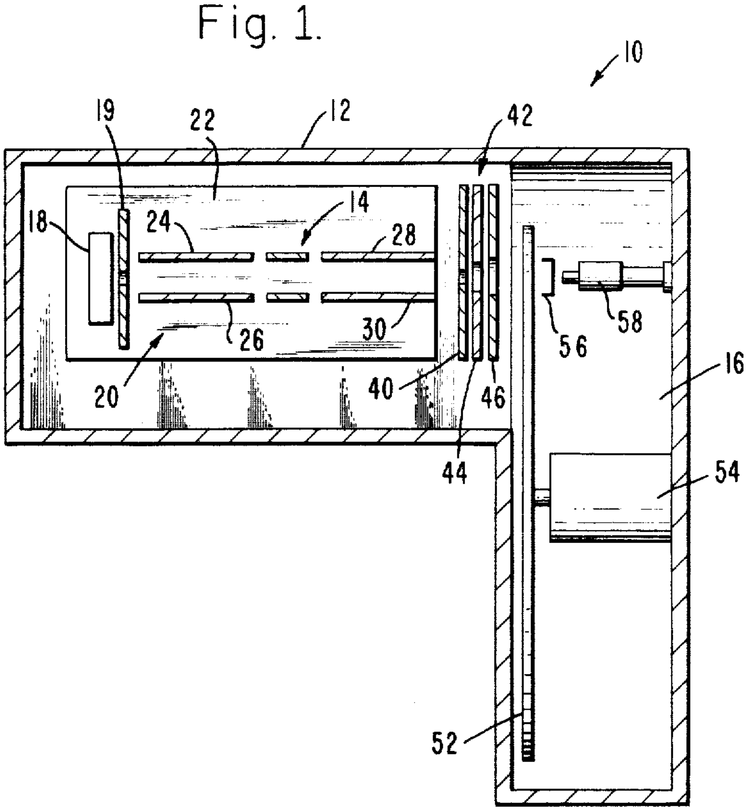
FIG. 1 is a plan view of an ion implantation system incorporating the focusing ExB mass separator for space-charge dominated ion beams of a first preferred embodiment in accordance with this invention.
Figure 2:
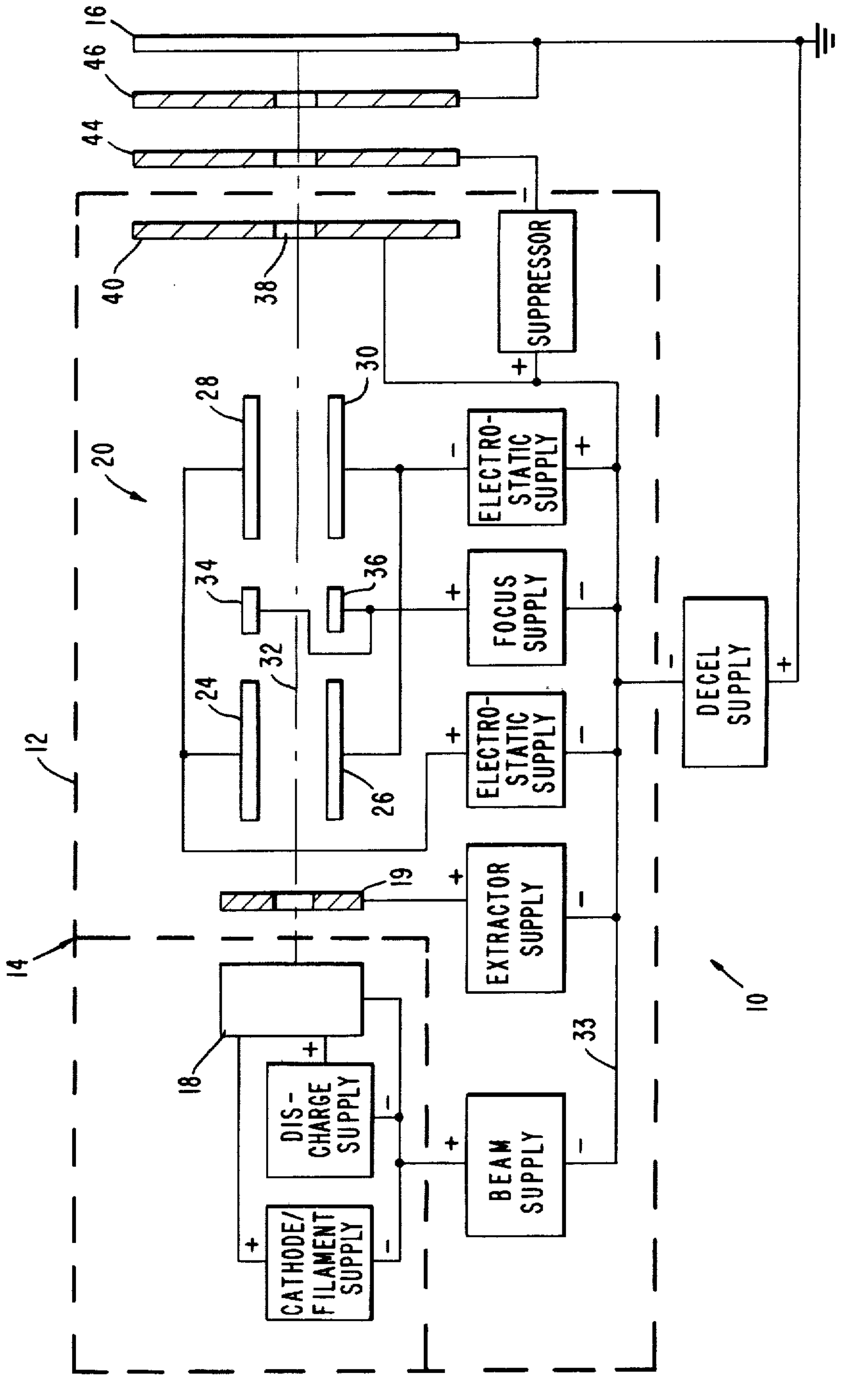
FIG. 2 is a schematic drawing showing the power supply and potentials applied in one operating example.
Figure 5:
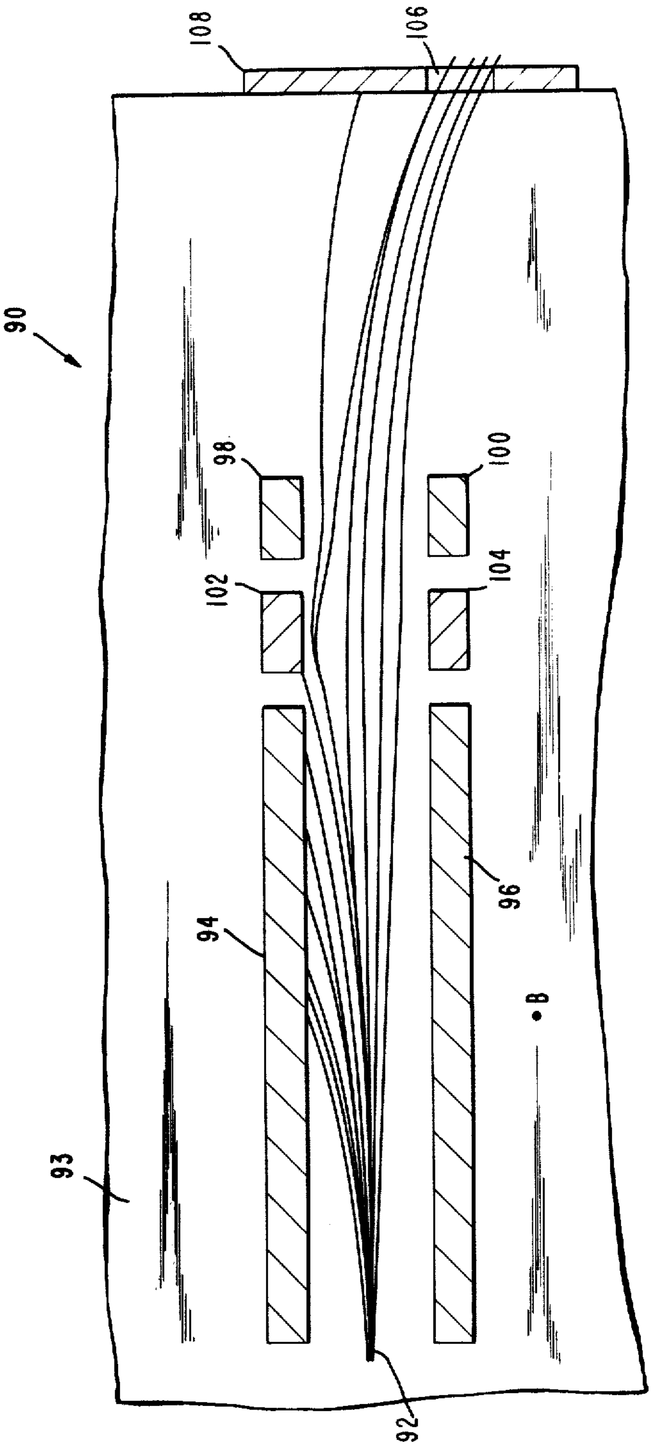
FIG. 5 is a plan view of a third preferred embodiment of the ExB separation section of the system, with parts broken away and parts taken in section.

Ion implantation system 10 is illustrated in FIGS. 1, 2 and 5. It comprises housing 12 which encloses beam forming and analyzing subsystem 14 in the left end thereof and target chamber 16 on the other end thereof with the target handling equipment therein to form the target subsystem. The two subsystems may be separated by a closable valve to separately control the vacuum therein. Suitable vacuum equipment is provided to satisfy the vacuum requirements. Ion source 18 with its extraction electrode 19 provides the high total current ion beam at a low voltage. The ribbon beam source described in Bayless et al U.S. Pat. No. 4,163,151 is preferrable, because to extract a high total beam current at a current density low enough for efficient transport, it is desirable to have as large a beam area as possible. However, a large beam area results in high gas throughput so that beam extraction openings from the source must be less than about 1 square centimeter to avoid prohibitively large vacuum pumps. A ribbon beam is also desirable because a comparatively large beam area can be provided and still not have the center of the beam too far from the electric field plates which cause separation of the various ion species. The aspect ratio of the extraction slit and optics must be at least 50 to 1 to minimize current loss due to improperly focused ions at the beam ends. Pierce geometry for the focus and extraction electrodes is suitable to produce from source 18 a high current low voltage ion beam. As an example, when the slit from the source 18 is 1 to 50 millimeters, and supplied with $BF_3$ as the source gas, and $-29.8$ kV applied for extraction, the current density is 32 milliamps/square centimeters to produce 1 milliamp of singly ionized boron in the beam. An extraction voltage of −29.8 kV is applied between the cathode in source 18 and the extraction optics represented by extraction electrode 19 and provides for a high current beam.

A uniform magnetic field region is provided for both the ion source 18 and the ExB separator 20. It is provided by a permanent magnet structure; the far pole piece is shown at 22. A near pole piece of corresponding position is removed from the near side of FIG. 1, but the near side pole piece is also provided together with magnetic field producing means. A permanent magnet is preferred. Magnetic field strength below about 1000 gauss is not adequate for resolving the mass species required, such as separating $B^+$ from $F^+$ or $As^+$ from $As_2{}^+$. The magnet with pole piece 22 thus produces a minimum strength of 1000 gauss. The same magnetic field is applied both to the ion source 18 and the ExB separator 20.

Figure 3:
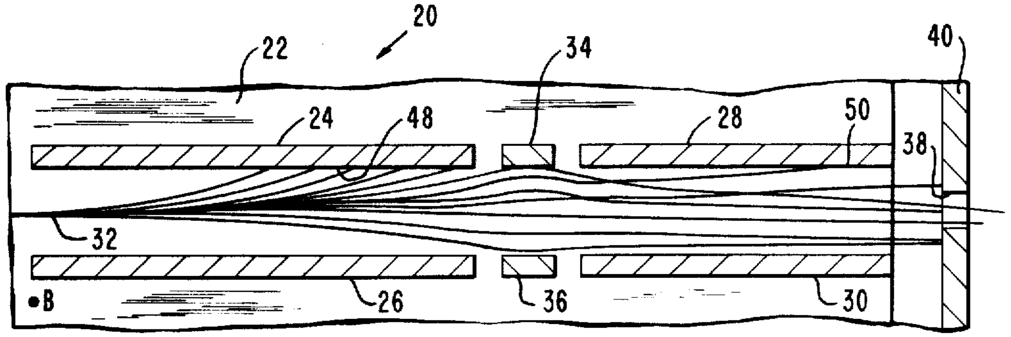
FIG. 3 is a plan view of the ExB section of the system, with parts broken away and parts taken in section.

The ExB separator 20 is a mass analyzer or velocity filter which uses an electric field normal to both the magnetic field and the ion trajectory to counter balance the Lorentz force on a particle of given velocity. As seen in FIGS. 1, 2, and 3, the ion beam moves generally through the center of ExB separator 20 from left to right, the magnetic field is normal to the sheet of the paper and the electric field is applied by potential plates 24, 26, 28 and 30. For convenience of identification, the ion beam is generally indicated at 32 in FIGS. 2 and 3. Under a balanced condition, a selective class of ions in beam 32 will pass straight through the separator 20 and particles of different mass or velocity will be deflected. This straight through characteristic of the ExB filter is advantageous for an ion implantation system because it allows a simple, compact design and convenient selection of the desired mass species. The use of permanent magnets reduces system costs and complexity, and the selection of the desired mass species can be easily made by adjusting the potential on the potential plates. In FIGS. 1, 2, and 3, the ribbon beam is positioned so that the viewer sees the edge of the beam. Furthermore, the potential plates operate in pairs, with plates 24 and 26 being one pair and plates 28 and 30 being another pair.

The potential of the floating around 33, in the present example minus 30 kV is the base potential through the entire ExB separator 20. Potentials of the potential plates are referred to this potential. In previous construction, only one, long pair of plates was used. In the present construction and for the particular example of boron, plates 24 and 28 are biased to a +900 volt potential and plates 26 and 30 are biased to a −900 volt potential, with respect to the reference potential of floating ground 33. Since space-charge effects within the beam are appreciable in the present high current low voltage beam 32, excessive beam spreading would occur if the conventional potential plates were employed. In the present ExB separator 20, focus plates 34 and 36 are positioned near the center of length of the potential plates. Focus plates 34 and 36 are biased to provide for beam focus, to keep the beam of selected species compressed as it travels through the separator section. In the example illustrated, a voltage of +11,000 volts with respect to the reference potential of floating ground 33 is applied to both of the focus plates to provide this focusing action. The action on the beam is similar to that of an einzel lens with a deceleration-acceleration region. Thus, the initial and final beam energy, before and after the focus plates is equal. Focusing is achieved over a relatively short length and does not interfere with the overall operation of the ExB separator. The ion path lines illustrated in FIG. 3 indicate the general paths of various ion species as they enter separator 20 and either impinge upon the walls or exit through separator slit 38 in separator plate 40. Separator plate 40 is at the reference potential of floating ground 33.

As seen in FIG. 1, decelerator 42 has supressor electrode 44 and decelerator electrode 46, with the electrodes having aligned openings for management of the selected species. When the supply gas is $BF_3$, then the undesired heavier species $BF_2{}^+$, $BF^+$ and $F^+$ impinge upon the inner surface of potential plate 24 generally in region 48. The undesired species $F^+$ impinges against plate 28 generally in region 50, or may reach the separator plate 40 away from opening 38. Desired species $B^+$ is accepted through the opening 38 of the separator plate 40 into decelerator 42. If there was an ion species in the beam lighter than $B^+$ it would impinge on the other side of the separator.

The source and separator have been designed for a constant voltage extraction. Such is more desirable both for source operation and separation. In order to achieve variable implant energy, decelerator 42 is provided. Because of the reduced current in the beam, due to the previous separation out of the undesired species, space-charge effects effects are much less severe at decelerator 42 so that deceleration is practical in this zone. The decelerator electrodes also serve as lenses, and in the illustration provided, suppressor electrode 44 is biased to minus one kilovolt and decelerator electrode 46 is at zero potential referred to real ground as is the target. Thus, the deceleration region is between electrodes 44 and 46.

The equipment in target chamber 16 and its subsystem is suitable for utilization of the selected species from the ion beam for ion implantation. Wafer wheel 52 is rotated by motor 54. Faraday cage 56 and high resolution spectrometer 58 are mounted on the beam path behind the wafer wheel. Impringement thereon occurs either through a window in wafer wheel 52 as it rotates, or the wafer wheel may also translate as taught in U.S. Pat. No. 4,258,266. This latter structure is preferred because the shape of the ribbon beam provides for more uniform distribution of ions when the targets are translated as well as rotated, but this depends on the size of the wafers with respect to the ion beam and its orientation.

Figure 4:
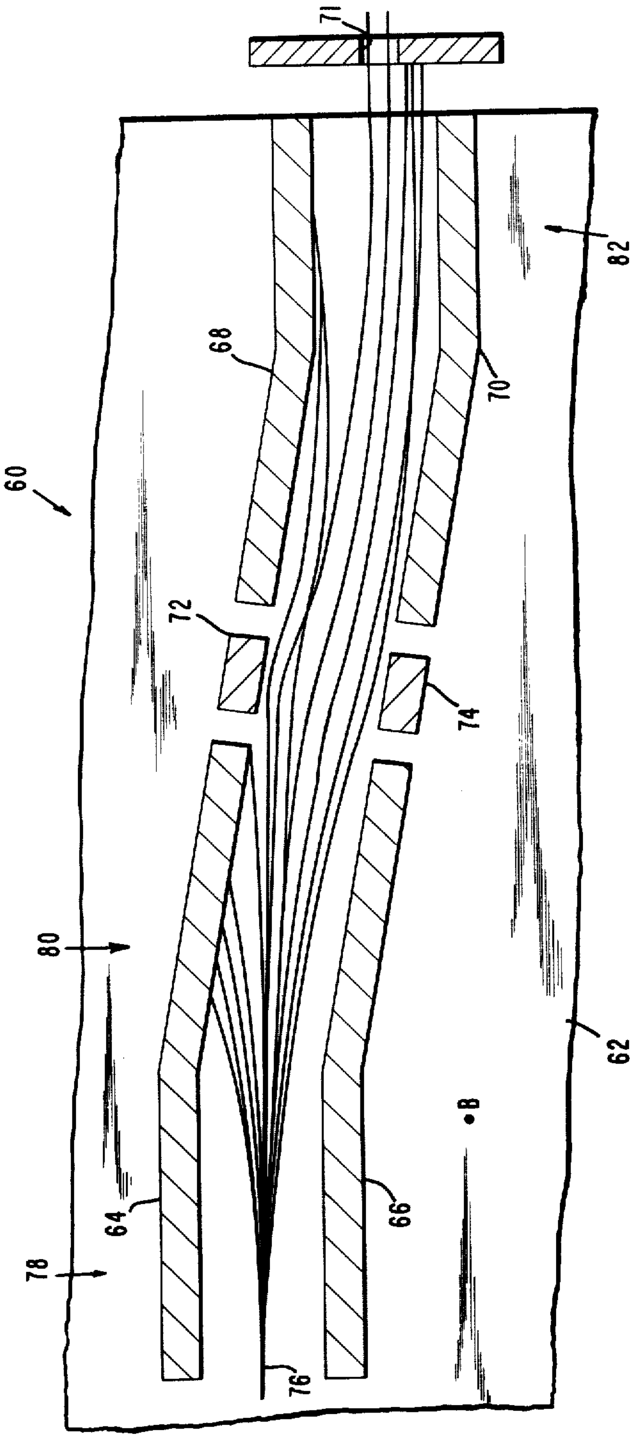
FIG. 4 is a plan view of a second preferred embodiment of the ExB separation section of the system, with parts broken away and parts taken in section.

FIG. 4 shows an ExB separator 60 in front of its magnetic pole piece 62. ExB separator section 60 can be substituted for the ExB separator section 20. Separator section 60 has pairs of potential plates 64 66, 68, and 70, similar to the plates 24–30. The separator section also has a pair of focus plates 72 74 which are positioned between the pairs of potential plates. These plates are all connected the same as the plates in FIGS. 2 and 3. The difference is the angular structure of the potential plates. They are biased to provide an offset path for the ion beam 76. The set of plates provides an entry section 78 which is positioned on the beam path as the beam arrives from the source. The separator 60 has a midsection 80 which is angularly positioned. It is made up of the second portion of the plates 64 and 66, together with the focus plate 72 and 74 and the first portion of the potential plates 68 and 70. The midsection 80 is positioned about 10° away from the entry path line of beam 76, and the plates are offset in the thin direction of beam 76. In FIG. 4, the edge of the ribbon ion beam is shown so that the deflection of midsection 80 is across the flat direction of the beam. The exit section 82 is parallel to the entry section 78 but is offset therefrom approximately the distance between the plates so that there is no straight line path through the separator.

There are neutral particles in the ion beam 76. These neutrals are generated by charge exhange along the first few centimeters of the beam path as it arrives from the ion source. In the boron example, the neutral beam consists mainly of $BF_2$ molecules. Since the neutral particles are not affected by the electric or magnetic fields, they pass straight through the separator of FIGS. 2 and 3. However, the offset separator 60 of FIG. 4 collects the neutrals on the upper side plates. The separation of charged particles takes place as described with respect to FIGS. 2 and 3, and selected ions are passed out through a separation slit 71 in the first element of the deceleration electrodes. In the structure of FIG. 4, plates 64 and 66 are − and + 800 V respectively, while plates 68 and 70 are − and + 1400 V respectively, with respect to the floating ground 33. It is the adjusting of these potentials that causes the beam to follow the offset path through the plates.

The ExB separator 90 shown in FIG. 5 is also similar to the separator 20 of FIGS. 2 and 3. It comprises a structure for separating ion beam 92 and includes a magnetic field perpendicular to the sheet in FIG. 5. The magnetic field is provided by a magnet with a pair of magnetic pole pieces, of which pole piece 92 is positioned on the far side of the plates. Potential plates 94 and 96 are the first pair of potential plates and are positioned across from each other in opposite sides of the beam path. Potential plates 98 and 100 are also provided as are focus plates 102 and 104. The structures operate in the same way and with the same potentials as the corresponding structures in FIGS. 2 and 3, but the potential plates 98 and 100 are shorter in the direction along the beam path. The shorter plates have the effect that as the remaining particles of the ion beam leave the influence of potential plates 98 and 100, the particles are still under the influence of the magnetic field so that the path of the remaining ion species is curved downward as indicated in FIG. 4. The selected ion species passes out through the opening 106 in separator plate 108. Separator plate opening 106 is out of line from the passage between the potential plates and focus plates so that neutral particles cannot exit through opening 106, but impinge on the side of separator plate 108. As a particular example, and similarly to FIGS. 1, 2 and 3, the potential on plates 94 and 98 is +900 volts while the potential on plates 96 and 100 is −900 volts and the potential on focus plates 102 and 104 is +11,000 volts with respect to the floating ground. Separator plate 108 is at the potential of the floating ground 33.

Similarily to FIGS. 3 and 4, the focus electrodes of FIG. 5 provide for focusing of the portion of the ion beam comprised of the selected species and thus overcomes the spreading caused by space-charge effects in high current, low voltage ion beams.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An ExB mass separator comprising:

means for providing a charged particle beam so that selected species in the beam pass along a beam path through said ExB mass separator;

means for applying a magnetic field along the beam path within said separator in a direction substantially normal to the path of particles in the beam;

first and second potential plates within the magnetic field and positioned on opposite sides of the beam path, means for applying potential to said first and second potential plates so that particles of the selected species within the beam move along a preselected beam path between said first and second potential plates;

first and second focus plates respectively positioned on opposite sides of the beam path and positioned within the magnetic field provided by said magnetic field means, said focus plates being positioned downstream along the beam path from said potential plates;

means for applying focus potential to both of said focus plates for applying focus force to the selected charged particle species for focusing the beam comprised of that selected species; and third and fourth potential plates positioned on opposite sides of the beam path and downstream along the beam path from said focus plates, said third and fourth potential plates being positioned within the magnetic field produced by said magnetic field means and being positioned to apply a potential in the direction substantially normal to a magnetic field in the beam path so that said third and fourth potential plates apply an electric field to the selected species in the beam to direct the beam along the preselected path in the magnetic field.

2. The ExB mass separator of claim 1 wherein said potential plates cause the selected species in the beam to move in a substantially straight line through the magnetic field.

3. An ExB mass separator comprising:

means for providing a charged particle beam so that selected species in the beam pass along a beam path through said ExB mass separator;

means for applying a magnetic field along the beam path within said separator in a direction substantially normal to the path of particles in the beam;

first and second potential plates within the magnetic field and positioned on opposite sides of the beam path, means for applying potential to said first and second potential plates so that particles of the selected species within the beam move along a preselected beam path between said first and second potential plates;

first and second focus plates respectively positioned on opposite sides of the beam path and positioned within the magnetic field provided by said magnetic field means, said focus plates being positioned downstream along the beam path from said potential plates;

means for applying focus potential to both of said focus plates for applying focus force to the selected charged particle species for focusing the beam comprised of that selected species;

third and fourth potential plates positioned on the opposite sides of the beam path and downstream along the beam path from said focus plates, said third and fourth potential plates being positioned within the magnetic field produced by said magnetic field means and being positioned to apply a potential in the direction substantially normal to the magnetic field in the beam path so that said third and fourth potential plates apply an electric field to the selected species in the beam to cause the beam to be directed along the preselected beam path in the magnetic field; and a separator plate having a separator opening positioned downstream from said plates and positioned on the preselected beam path so that the selected species in the beam substantially passes through said separator opening.

4. The ExB mass separator of claim 3 wherein said potential plates cause the selected species in the beam to move in substantially a straight line through the magnetic field.

5. The ExB mass separator of claim 4 wherein said third and fourth potential plates are sized, positioned and biased so that the selected species moves in a curved beam path downstream from said focus plates and said opening is positioned away from the center line of the beam path as it passes between said first and second potential plates.

6. The ExB mass separator of claim 5 wherein there is ion source means for providing the ion beam and said ion source means provides a beam which is substantially greater in the direction of the magnetic field than in the direction of the electric field.

7. The ExB mass separator of claim 3 wherein said means for providing a beam is an ion source.

8. An ExB mass separator comprising:

means for producing a beam of ions along an ion beam path;

magnetic means for producing a magnetic field substantially normal to the ion beam path;

a separator plate having a separator aperture therein, said aperture being laterally positioned with respect to the entrance center line of the beam;

first and second potential plates positioned laterally of the beam path on opposite side thereof;

means for applying potential to such first and second potential plates to control the path of the selected species in the ion beam therethrough, said first and second potential plates being configured and biased to cause the beam of selected species to curve in a lateral direction;

first and second focus plates respectively positioned within the magnetic field produced by said magnetic field means, downstream of said first and second plates and on opposite sides of the beam of selected species;

means for applying a potential to said first and second focus plates to focus the portion of the beam comprised of the selected species;

third and fourth potential plates positioned with in the magnetic field produced by said magnetic field means and positioned on opposite sides of the portion of the beam carrying the selected species;

means for applying potential to said third and fourth potential plates for causing the portion of the beam comprised of the selected species to be directed at said aperture in said separator plate so that the beam of the selected ion species passes through said opening.

9. The ExB mass separator of claim 8 wherein said third and fourth potential plates are biased and configured to bend the portion of beam consisting of the selected species in a lateral direction so that the beam path into said opening is substantially parallel to the entrance beam center line.

10. The ExB mass separator of claim 9 wherein there is ion source means for providing the ion beam and said ion source means provides a beam which is substantially greater in the direction of the magnetic field than in the direction of the electric field.

* * * * *